M. P. BROWN.
Wash-Stand.
No. 164,967. Patented June 29, 1875.
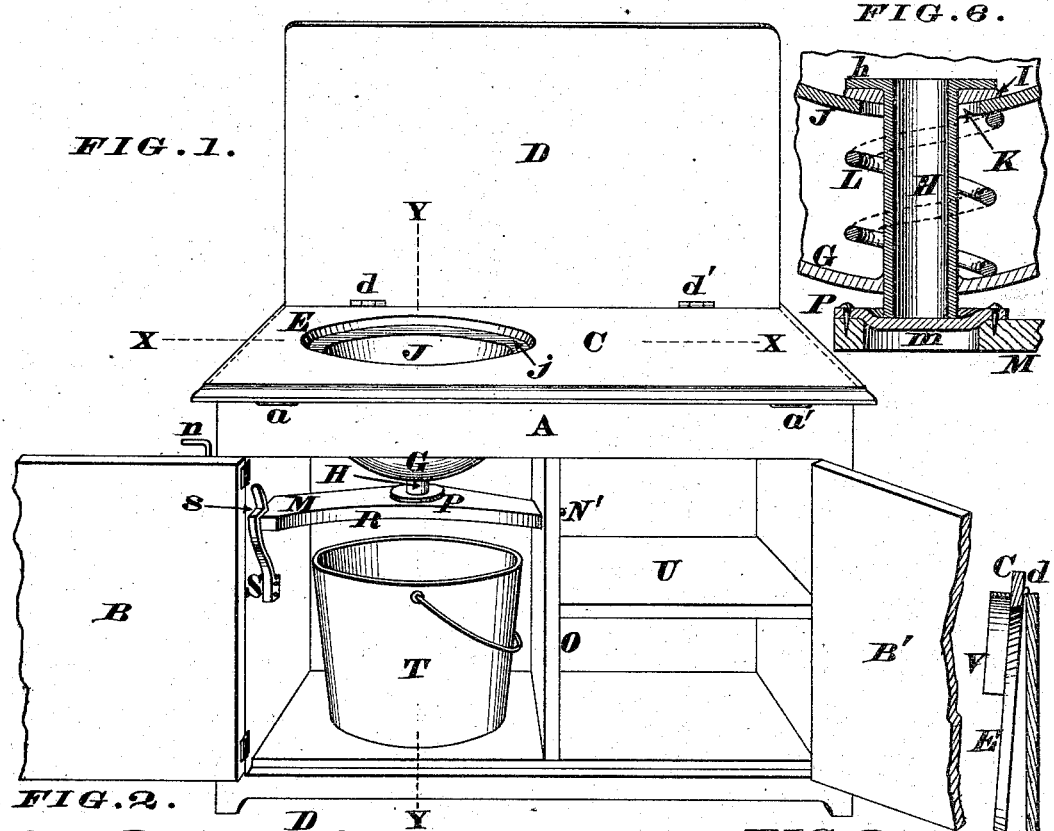
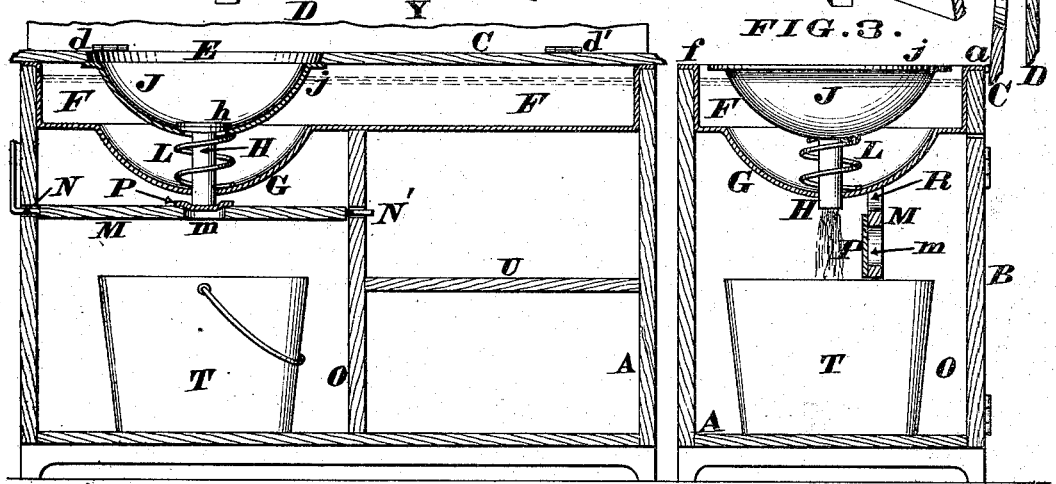
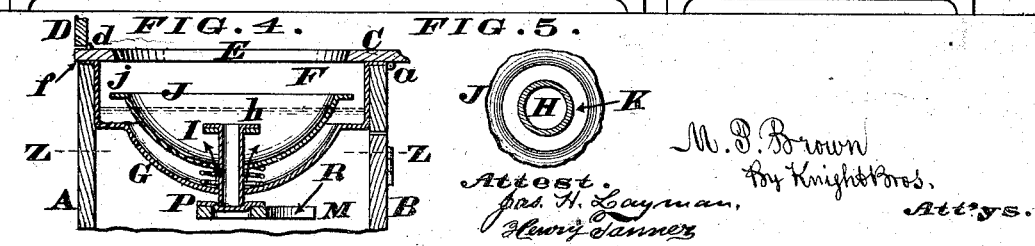

UNITED STATES PATENT OFFICE.

MERCILEUS P. BROWN, OF LEXINGTON, MISSOURI.

IMPROVEMENT IN WASH-STANDS.

Specification forming part of Letters Patent No. 164,967, dated June 29, 1875; application filed May 14, 1875.

*To all whom it may concern:*

Be it known that I, MERCILEUS P. BROWN, of Lexington, La Fayette county, Missouri, have invented a new and useful Wash-Stand, of which the following is a specification:

My invention comprises a tank or reservoir so arranged in the upper part of a wash-stand as to be entirely concealed, except when it is to be supplied with water. My invention further comprises a basin which is capable of being shifted either vertically or horizontally, or rotated axially, for the purpose of allowing it to be filled with clean water from the reservoir. My invention further comprises a device for emptying the basin after use. My invention further comprises a provision for heating the water in the tank.

In the accompanying drawing, Figure 1 is a perspective view of my improved wash-stand in condition for being filled, the doors being open. Fig. 2 is a section at the line X X, the basin being represented in its elevated or normal position. Fig. 3 is a section at the line Y Y, the basin being shown depressed, so as to be in condition to receive water from the tank. Fig. 5 is a section through the basin at the line Z Z. Fig. 6 is an enlarged axial section through the stand-pipe and its accessories.

A represents the frame or case of the wash-stand, having its front closed by door or doors B B', which permit access to the interior of the stand. Hinged to the upper front edge of the case A, as at a a', is a leaf, C, to whose rear edge is hinged, at d d', a lid, D. E is a circular opening in the leaf C. The leaf C, when elevated, as shown in Figs. 1 and 3, exposes a sheet metal or other suitable tank or reservoir F, which extends the entire length and width of the interior of case A, and may be of any suitable depth. This tank is furnished with horizontal flanges f, which project outwardly, so as to rest upon the upper edge of frame A, and to thereby assist in maintaining the reservoir in its proper position. Located toward one end of this tank, and in line with the opening E of leaf C, is a concave depression or pit G, having a central stand-pipe, H, rigidly secured to it. The lower end of this pipe projects a slight distance below the pit, while its upper end is elevated about as high as the bottom of tank F, and terminates with an annular flange or collar, h, beneath which a leather or india-rubber or other suitable gasket, I, is secured. This gasket fits snugly around the stand-pipe H, as more clearly shown in Fig. 6. The stand-pipe H serves as a guide for the vertically shiftable wash-bowl J, whose shape corresponds with that of the pit G. The bowl or basin is furnished with a central aperture, K, of somewhat larger diameter than the stand-pipe H, in order to allow the ingress of water from the tank when the bowl is depressed for that purpose. j is a marginal flange or rim of the basin, which flange is designed to fit up snugly against the under side of leaf C when said basin is elevated, so as to prevent the contents of the bowl being slopped over into the clean water in the tank F. Surrounding the stand-pipe H is a coiled spring, L, whose stress maintains the basin J against the gasket I with sufficient pressure to prevent any leakage, such as would allow the contents of the bowl to enter the tank. This spring is powerful enough to resist any ordinary pressure upon the bowl in the act of ablution, and is nevertheless sufficiently yielding to permit the basin to be depressed for filling.

In order to retain water in the basin as long as may be necessary, and to enable its discharge when done with, I employ a rocking beam or board, M, having two gudgeons, N N', of which the gudgeon N is journaled in one end of the case A, and the gudgeon N' in the vertical partition O. The exposed gudgeon N terminates outside the case with a crank n, wherewith the rocking beam M is operated. This beam is pierced with a circular aperture, m, across which a yielding diaphragm, P, is secured, and serves as a stopper to the pipe H whenever said beam is brought to the horizontal position shown in Figs. 1, 2, 4, and 6. The front end of the beam is concaved at R, so as to avoid contact with the pit G when said beam is brought to the vertical position shown in Fig. 3.

For the purpose of maintaining the valve P securely closed a spring, S, is secured within the case A, which spring has a shoulder, s, that bears upon the upper surface of the beam M, as seen in Fig. 1. T represents a bucket or other receptacle for the discharged water. This receptacle may, however, be omitted, and a funnel communicating with a drain or sink be substituted. U is a shelf for towels, &c.

If preferred, a verge or curved flange, V, may depend from the under side of leaf C, so as to assist the flange j in preventing the contents of the bowl being slopped over into the tank.

To arrange my wash-stand for use, the leaf C and lid D are first turned forward to the position shown in Fig. 3, thereby exposing the tank F, and allowing it to be filled with the greatest facility. Water is then poured into this reservoir until the latter is nearly full, after which the leaves C and D are folded down, so as to close the tanks and to completely exclude the dust. In this normal position of the various members the spring L forces the bowl J so tightly up against the gasket I as to close the inlet K, and thereby prevent the flow of water from the tank into the bowl.

When it is desired to use the wash-stand the lid D is turned back to a vertical position, and the bowl J depressed by hand far enough to allow as much water to flow into it as may be necessary. This flow takes place through the inlet K, and when the reservoir is full the bowl also receives water over the rim j. The entrance of water through the inlet K is shown in Fig. 4. The bowl having been thus filled or charged with as much water as desired, and the pressure being withdrawn, the spring L promptly elevates the bowl to its original position, the bearing against the gasket I preventing the contents of the bowl mingling with those of the tank.

As the normal position of the beam M is horizontal, or nearly so, it will be seen that the diaphragm P prevents any leakage through the stand-pipe H; but as soon as it is desired to empty the bowl the crank n is turned toward the rear of the stand, which act swings the beam away from the delivery end of said pipe, as shown in Fig. 3, and discharges the contents of the bowl. The pipe being then closed by a return motion of the beam, the stand is ready for use again. The pit G enables the basin J to be charged so long as any water remains in the tank, and by making the receptacle T of the same capacity as the reservoir F, it will indicate that the latter is empty as soon as the former is filled with dirty water.

The form here selected for illustration may be varied in non-essential particulars; for example, in some stands it may be found desirable to shift the bowl horizontally for the purpose of filling it from the tank, and sliding it an equal distance beyond the center to discharge its dirty water; or the bowl may be rotated, so as to fill it, and be then turned in the reverse direction for emptying.

An ordinary plug or stopper may be applied to the upper end of the stand-pipe H. The shelf U may support a lamp or other heating apparatus, for the purpose of raising the temperature of the water in the tank.

My wash-stand is especially applicable for use in hotels or on railway-cars and on board of steamboats. When used on cars or other public conveyances a rubber or leather packing-ring should be interposed between the flange f and the leaf C, so as to prevent the escape of water and to avoid rattle.

I claim as new and of my invention—

1. In combination with the stand A and its inclosed tank F, the shiftable wash bowl or basin J, adapted to be filled from said tank by the described motion therein, and to be emptied substantially in the manner explained.

2. The described combination of tank F, pit G, stand-pipe H h, gasket I, vertically-shiftable bowl J K, and elevating-spring L, as and for the purpose set forth.

3. The combination of rocking beam M N n N', diaphragm P, and spring-catch S s, as and for the objects stated.

4. The combination of case A, hinged leaf a a' C E, and hinged lid D d d', when located above the tank F and basin J, as and for the purpose herein set forth.

In testimony of which invention I hereunto set my hand.

MERCILEUS P. BROWN.

Attest:
GEO. H. KNIGHT,
WALTER KNIGHT.